US011677617B1

(12) United States Patent
Totappanavar et al.

(10) Patent No.: US 11,677,617 B1
(45) Date of Patent: Jun. 13, 2023

(54) HIGHLY AVAILABLE AND SCALABLE SALTSTACK BASED MANAGEMENT PANE FOR APPLICATION MONITORING

(71) Applicant: VMware, Inc., Palo Alto, CA (US)

(72) Inventors: Vineeth Totappanavar, Bangalore (IN); Venkata Padma Kaki, West Godavari (IN); Vinothkumar D, Tamil Nadu (IN); Rahul Singh, Benares (IN); Aswathy Ramabhadran, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/727,770

(22) Filed: Apr. 24, 2022

(51) Int. Cl.
*G06F 13/00* (2006.01)
*H04L 41/0654* (2022.01)
*H04L 67/56* (2022.01)
*G06F 9/50* (2006.01)
*H04L 9/40* (2022.01)

(52) U.S. Cl.
CPC .......... *H04L 41/0654* (2013.01); *G06F 9/505* (2013.01); *H04L 67/56* (2022.05); *H04L 63/08* (2013.01)

(58) Field of Classification Search
CPC ..... H04L 41/0654; H04L 67/56; H04L 63/08; H04L 65/56; G06F 9/505
USPC ..... 709/202, 224, 203, 209; 718/105, 100, 1
See application file for complete search history.

(56) References Cited

U.S. PATENT DOCUMENTS

| | | | | |
|---|---|---|---|---|
| 8,850,528 | B2* | 9/2014 | Van Biljon | H04L 67/60 709/224 |
| 8,977,679 | B2* | 3/2015 | Van Biljon | G06F 21/6218 714/4.11 |
| 9,032,069 | B2* | 5/2015 | Van Biljon | G06Q 40/00 709/224 |
| 10,592,350 | B2* | 3/2020 | Dornemann | G06F 11/1658 |
| 11,175,964 | B2* | 11/2021 | Jaeger | G06F 8/60 |
| 2005/0172161 | A1 | 8/2005 | Cruz et al. | |
| 2006/0015618 | A1 | 1/2006 | Freimuth et al. | |
| 2012/0117229 | A1* | 5/2012 | Van Biljon | H04L 67/10 709/224 |
| 2013/0060839 | A1* | 3/2013 | Van Biljon | H04M 15/66 709/203 |

(Continued)

OTHER PUBLICATIONS

Getting Started with Containers, Red Hat Enterprise Linux Atomic Host 7, Red Hat (Year:2020), Jun. 6, 2020, 64 pgs.

(Continued)

*Primary Examiner* — Kenneth R Coulter

(57) ABSTRACT

The present invention entails a highly available system comprising at least one host with at least one monitoring agent fit to send data, a cloud based proxy fit to receive the data, wherein said proxy comprises: an adapter, a master monitoring agent fit to command the at least one monitoring agent, and a failover server. The highly available system is further made up of at least one secondary cloud based proxy capable of communicating with the cloud based proxy, wherein the secondary cloud based proxy also comprises: a second adapter, a second master monitoring agent fit to command at least one monitoring agent, and a second failover server fit to communicate with the failover server. Finally, the highly available system also includes a node, wherein the node communicates with at least the cloud based proxy and the secondary cloud based proxy.

19 Claims, 2 Drawing Sheets

(56) References Cited

U.S. PATENT DOCUMENTS

| | | |
|---|---|---|
| 2015/0295800 A1 | 10/2015 | Bala et al. |
| 2016/0366142 A1 | 12/2016 | Kamble |
| 2017/0262347 A1* | 9/2017 | Dornemann ........ G06F 11/3433 |
| 2018/0191718 A1 | 7/2018 | Kuzkin et al. |
| 2019/0190771 A1* | 6/2019 | Fang ....................... H04L 41/40 |
| 2020/0250009 A1* | 8/2020 | Jaeger ................. G06F 9/45541 |
| 2021/0397522 A1 | 12/2021 | Owen et al. |

OTHER PUBLICATIONS

Ellingwood, How to Set Up Highly Available HAProxy Servers with Keepalived and Reserved IPs on Ubuntu 14.04 (Year: 2015), 2015, 26 pgs.

Ramirez, How to Run HAProxy with Docker (Year: 2021), 2021, 6 pgs.

Shetti, Application Status Collection in Kubernetes via Telegraf Sidecars and Wavefront, Aug. 8, 2018, 14 pgs.

* cited by examiner

HIGHLY AVAILABLE AND SCALABLE SALTSTACK BASED MANAGEMENT PANE FOR APPLICATION MONITORING

BACKGROUND ART

In order to monitor numerous virtual machines at once, VMware has developed systems for application monitoring and metric analysis in order to assist an end user in understanding the state of their applications. Prior solutions were functional but had the drawback of a hard limit on the number of applications that could be monitored at once. Should the end user exceed that number, they would have to pick and choose which applications to prioritize in monitoring and analyzing.

BRIEF DESCRIPTION OF THE DRAWINGS

The accompanying drawings, which are incorporated in and form a part of this specification, illustrate embodiments of the present technology and, together with the description, serve to explain the principles of the present technology.

DETAILED DESCRIPTION OF THE EMBODIMENTS

Figure 1:
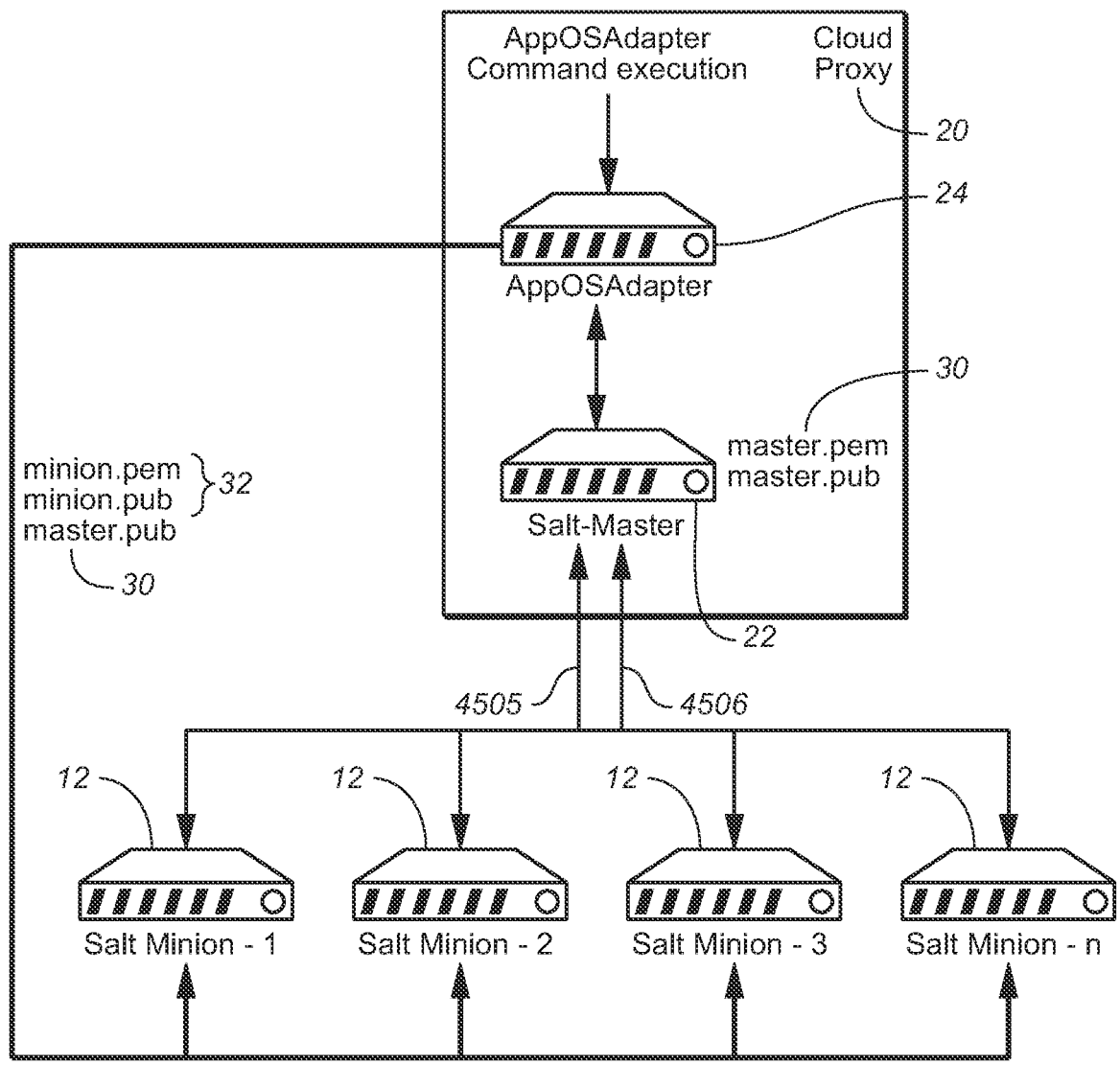
FIG. 1 is a SaltStack based management plane metric flow diagram of the existing application monitoring system.

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

Metrics allow an end user to have insight on the state, behavior, value, or changes of a particular system or subsystem that is recognized by the metric name. There are many components that generate metrics, and there are different systems and tools that may receive the metrics and visually display them in a graphical format for better understanding on the user's part.

vROps based Application Monitoring solution enables infrastructure and Application Administrators to collect metrics related to Operating System and Applications running on the Hosts and helps them in troubleshooting during mission critical issues. vROps installs agents at the Hosts to collect the runtime information's about various components running on the Hosts. It also provides LCM (Life Cycle Management) capabilities to the agents running on the Hosts. As part of LCM capabilities, features like the ability to Start/Stop the Agent, install Plugins, and upgrade Content of the Application Management agents running on the Hosts are provided. Such agent management based activities fall under the SaltStack based management activities (or control plane activities).

LCM for Application Management in vROps is provided by SaltStack, which installs an agent called Salt Minion at the Host and Salt Master at the Control Node (Cloud Proxy). A persistent connection would be established between Salt Master and Salt Minion during start-up of these services. With this, Salt Master would be capable of executing various commands on the Host with the help of Salt Minion running on this. This would enable vROps to manage all the Control Pane activities that would provide the LCM capabilities for Application Management solution.

A Salt Minion is the agent that gets installed on each endpoint host during agent installation activities. vROps provides an option that allows the user to manage the host and track and collect information on the OS running on the host. The Salt Master is what manages the Salt Minions. Once authentication between the two has been established, the two will establish a persistent connection that is used to handle the post agent installation activities. Should any component of the previously existing design fail, the persistent connection would be disrupted.

The previously existing solution is not scalable as Salt Master is capable of handling a restitched number of Salt Minions. The end user would then be forced to choose which Salt Minions they want to monitor, leaving the rest un monitored. This in-turn makes the Application Management solution unscalable and prone to failures during the failure of any one of the SaltStack components involved.

The present invention involves making SaltStack components (Salt Master and Salt Minion) resilient to failures, in other words giving the system High Availability capabilities. In another embodiment, Load balancing capabilities of HAProxy are also used to help with Horizontally scaling the environment.

In the current invention, a Highly Scalable solution for Application Monitoring in vROps is provided using Collector Group. Here, multiple Cloud Proxy instances are put together to form a virtual entity and that is called Collector Group. A collector group may have any number of cloud proxies within it, but a typical case might see the user having sixteen or less Cloud Proxies in a single group. As multiple instances of Salt Master can be run in each of the Cloud Proxy instance, there would be no single point of failure to it. KeepaliveD provides Floating/Virtual IP, and HAProxy provides Load balancing of the requests from the Salt Minions. KeepaliveD would switch Virtual IP to the next available backup node on failure of HAProxy or itself. HAProxy would take care of any failure that could occur with Salt Master. Together, all of this helps to achieve Horizontal Scaling and makes SaltStack components resilient to failures. With this Application Management solution in vROps would be Highly Available and Scalable.

FIG. 1 shows a SaltStack based management plane metric flow diagram of the existing application monitoring system. In this schematic that shows the Salt Minion monitoring flow, it can be seen that there are multiple instances of Salt Minion 12 (Salt Minion-1, Salt Minion-2, Salt Minion-n, etc.), and a single Cloud Proxy 20 that contains an AppOSAdapter 24 and a Salt-Master 22. The main issue with this design is within the Cloud Proxy 20, and the single instances of AppOSAdapter 24 and a Salt-Master 22. Should either of AppOSAdapter 24 and Salt-Master 22 fail, the whole system would be paralyzed. As such, AppOSAdapter 24 and a Salt-Master 22 are two potential single points of failure.

In the existing deployment design of Application Monitoring, there can be only one AppOSAdapter 24 created per configured VCenter in vROps. This was the main point of failure within the stack. Because of this restriction, the other components in the stack which communicated with AppOSAdapter 24, like Salt Master 22, was also a single service and therefore a single point of failure.

Master keys 30 (master.pem and master.pub) are generated during startup of Salt Master 22 service. During installation of the Agent or Bootstrap activity on the Host, the minion keys 32 (minion.pem and minion.pub) and the Master public key 30 are sent first. With this, upon the start of Salt Minion 12 it will be securely able to connect to Salt Master 22 running on the Cloud Proxy. This secured connection between the Salt Master 22 and Salt Minion 12 helps to achieve LCM capabilities to Application Management solution.

In this currently existing design should, for example, the AppOSAdapter 24 go down or fail to function properly in any way, then the entire system will fail to function and communication between the Salt Master 22 and Salt Minion 12 would be lost. Another example of a single point of failure would be if the link between Salt Master 22 and Salt Minion 12 itself failed. In another example, if a single Salt Minion (e.g. Salt Minion-1) were to fail, the other Salt Minions 12 would still be able to contact the Salt Master 22, so while the entire system might not fail as it would in the previous examples it would still be unideal for the end user. Most commonly, the single point of failure will be the Salt Master 22.

Figure 2:
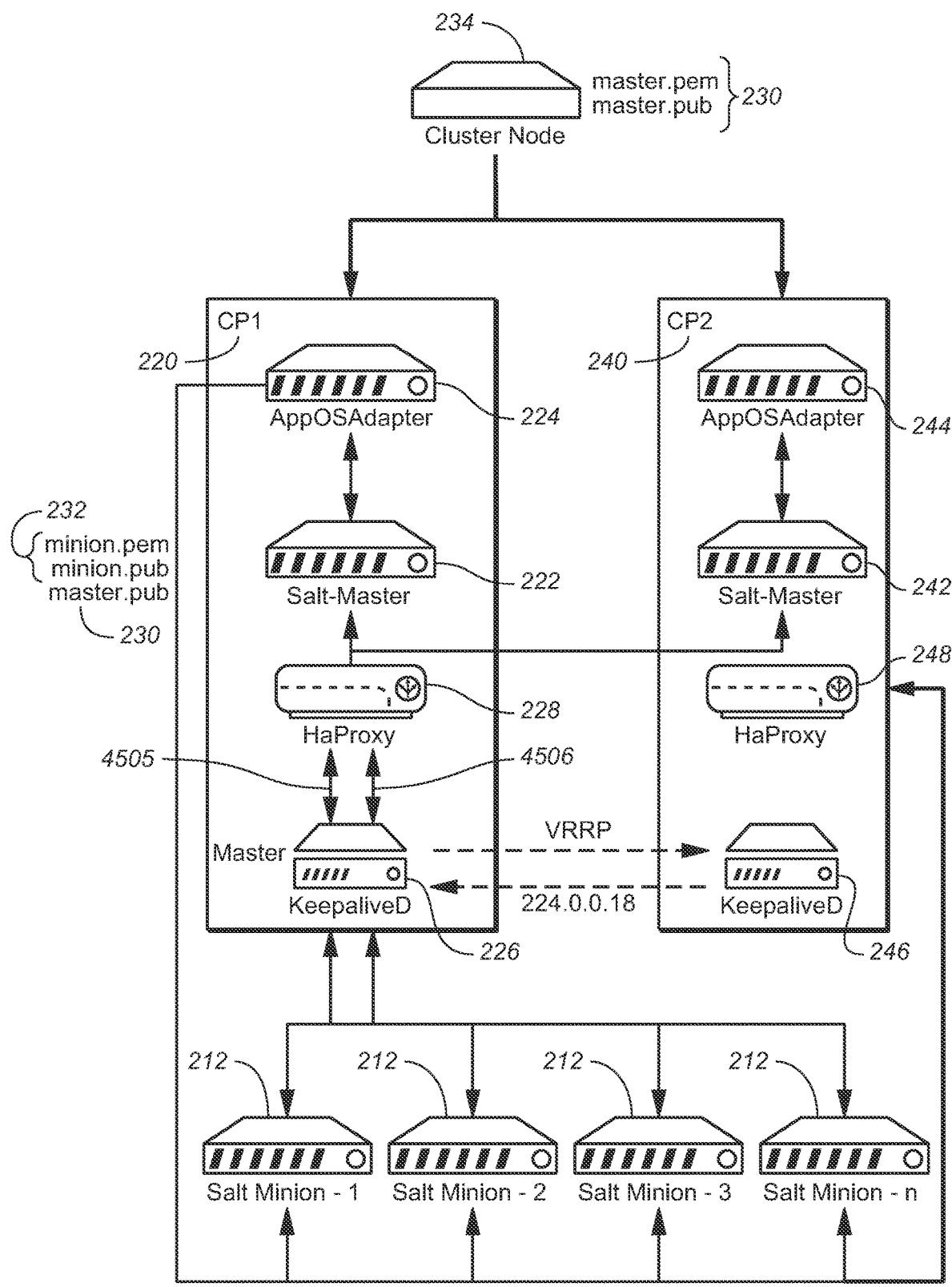
FIG. 2 is a SaltStack based management plane metric flow diagram of the proposed application monitoring system.

FIG. 2 shows a SaltStack based management plane metric flow diagram of the proposed application monitoring system. In this embodiment, there are one or more instances of the Salt Minions 212. The present embodiment also includes a receiving vROps Cluster Node 234. The last portion of this embodiment is a first Cloud Proxy 220 and a second Cloud Proxy 240. The first Cloud Proxy 220 includes: a KeepaliveD 226, a HAProxy 228, a Salt Master 222, and an AppOSAdapter 224. Similarly, the second Cloud Proxy 240 includes: a second KeepaliveD 246, a HAProxy 248, a Salt Master 242, and an AppOSAdapter 244.

While two cloud proxies are shown in this embodiment, it should be appreciated that this design allows for more cloud proxies to be added according to the end user's needs. The cloud proxies act as an intermediary component. The ability of the end user to add on more cloud proxies allows the user to horizontally scale their setup to allow for as few or as many applications to be run and tracked as they require.

In the proposed design, there could be multiple Cloud Proxies added to a Collector Group. A Collector Group is a virtual entity or a wrapper on top of the Cloud Proxies for grouping them. In such a scenario, Cloud Proxy 220, 240 would offer resistance against failure of the services in Control Pane. Instead of pinning a AppOSAdapter to a Collector Group we now pin it with each of the Cloud Proxies 220, 240 part of the Collector Group. This would create multiple AppOSAdapter 224, 244 instances to handle any failure.

Master keys 230 that were earlier generated by Salt Master 22 would now be generated at a common place in the Cluster Node 234 and distributed to all Cloud Proxy 220, 240. On First boot of Cloud Proxy machine, the Master keys 230 would be preceding with the Salt Master 222, 242. With this all the Salt Masters 222, 242 running on each of the Cloud Proxy 220, 240 instances would now have same master keys. This will enable Salt Minion 212 to connect to any Salt Master 222, 242.

Minion keys 232 that would be generated during Agent install or Bootstrap activity of Host would get preceded to the Salt Minions 212 running on the Hosts. Along with this, these keys 232 will now be distributed to all the Cloud Proxies 220, 240 part of Collector Group. An upstream mechanism would be utilized where the minions key 232 files would get pushed to the Cluster node 234, and from there would get distributed to all the Cloud Proxy 220, 240 instances using the downstream mechanism.

KeepaliveD 226, 246 exposes a VIRTUAL/FLOATING IP to the downstream endpoint nodes. KeepaliveD 226, 246 works in Master-Backup mode. KeepaliveD 226, 246 would take care of managing this IP on any failures in upstream services. Meaning if there is a failure in HAProxy 228, 248 or the KeepaliveD (e.g. 226) service itself, then the IP would be shifted to the next available node of KeepaliveD (e.g. 246) service. Salt Minion 212 running on the Host would establish a persistent connection using the VIRTUAL IP exposed by KeepaliveD 226, 246 with Salt Master 222, 242.

HAProxy 228, 248 would also take care of Load-Balancing Salt Minion 212 requests along with handling any failure with its Upstream services. So, if there is any failure with Salt Master (e.g. 222), it would reroute the requests to the next available Salt Master (e.g. 242) instance. As the Source method is being used to balance the request distribution, during the initial connection request coming from a Salt Minion 212 running from a particular IP would always get routed the same Salt Master 222, 242 running on Cloud Proxy 220, 240. So, the requests would now get equally get distributed among the available Salt Master instances 222, 242. By adding a new instance of Cloud Proxy based on need, Application Monitoring could Horizontally scaled.

In one embodiment, the Load-Balancing mechanism of HAProxy 2288, 248 works with a by source method, meaning all the instructions from a first IP address will be routed to a first Salt Master (e.g. 222). In other words for example, everything coming from Salt Minion-1 and Salt Minion-2 will be a connection of Salt Master 222 of the first Cloud Proxy 220, whereas everything coming from Salt Minion-3 and Salt Minion-n will run through Salt Master 242 of the second Cloud Proxy 240.

Should a load balancing method other than by source be used, possible errors could occur in the system such as Salt Minions reporting tasks are completed to a Salt Master that is different than the one that assigned the task, resulting in the completion message never being properly received.

In one embodiment, the plurality of Salt Masters across the various Cloud Proxies are able to communicate with each other. In such an embodiment, the communication of the Salt masters would enable other applicable load balancing methods (for example round robin methods) due to completion receipts no longer needing to be received by the same Salt Master that assigned the task.

In the present invention, KeepaliveD 226, 246 and HAProxy 228, 248 by default does not provide persistent TCP connection. By increasing the connection timeout, persistent connection can be achieved and thus would be able to achieve a Highly available and Scalable Control pane connectivity with SaltStack. It should be appreciated that any other cloud proxies attached to the system may be included in the master-backup format and could potentially take on the equivalent master roll in case of the original master failing.

In one embodiment, HAProxy 228, 248 is not present, and KeepaliveD 226, 246 communicate directly with Salt Master 222, 242 respectively.

In the present invention, if the AppOSAdapter 224 from the first Cloud Proxy 220 were to fail then they system would compensate by utilizing AppOSAdapter 244 from the second Cloud Proxy 240 such that they system may run uninterrupted. Similarly, if Salt Master 222 were to go down then Salt Master 242 would be able to take over and keep the system operating.

In the previous design as there was a single Salt Master instance, during LCM activity Salt Master 22 was used to execute commands on this instance. In the present invention, any Salt Minion 212 could get connected to any Salt Master 222, 242 running on the Cloud Proxy 220, 240 instance, LCM commands will need to be executed on all the Salt Master 222, 242 instances. To achieve this, a modification would need to be made on the bridge layer to distribute the request to all the AppOSAdapter 224, 244 instances. AppOSAdapter 224, 244 would in-turn execute the command on the Salt Master 222, 242. Every Salt Master 222, 242 command contains an identifier of the Host (e.g. vcID_vmmor). Command would get successfully executed on one of the Salt Master 222, 242 which has connectivity with that Host and would get ignored by the SaltStack if there is no connectivity with that identifier. Same as we distributed the request, now we would have to collate the response from all the Salt Master 222, 242 to finally conclude the LCM activity as success to show the status on UI.

vROps is mainly works on metrics. In one embodiment, there is a SaaS version of this product where metric data is collected from on premise data centers and pushed to Cloud components. A user would use this solution to monitor their critical Application infrastructure. In this scenario any downtime of our services/components in reporting would be totally unacceptable.

The current invention solves many problems of preexisting designs when it comes to High Availability solutions. Along with making the solution Highly Available, another barrier related to scalability of the solution is also solved. Advantages of using this solution include: Horizontal Scale-out of Application Monitoring can be achieved, equal or better utilization of Cloud Proxy resources, and the scale number would be directly proportional to the Number of Cloud Proxies in Collector Group.

The current invention makes the existing components of Application Monitoring Resilient to failures. It would provide better utilization of the resources. It would exponentially increase the scaling number of Application Monitoring solution. For end users the current invention has the benefit of having absolutely zero downtime caused by failure of any of the components/service. By building a scalable solution to address the needs of Control Pane for Application Management, the present invention provides a much-needed feature to end users.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments can be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What we claim is:

1. A highly available system comprising:
   at least one host with at least one monitoring agent configured to send data;
   a cloud based proxy configured to receive said data, said cloud based proxy comprising:
   an adapter configured to receive said data;
   a master monitoring agent configured to command said at least one monitoring agent; and
   a failover server;
   at least one secondary cloud based proxy capable of communicating with said cloud based proxy, said at least one secondary cloud based proxy comprising:
   a second adapter configured to receive said data;
   a second master monitoring agent configured to command said at least one monitoring agent; and
   a second failover server, configured to communicate with said failover server; and
   a node, wherein said node communicates with at least said cloud based proxy and said at least one secondary cloud based proxy.

2. The highly available system of claim 1 wherein, said failover server reroutes said data to said second failover server in event of failure of upstream components.

3. The highly available system of claim 1 wherein, said cloud based proxy further comprises:
   a proxy, said proxy capable of communicating with at least said master monitoring agent and said second master monitoring agent; and
   said secondary cloud based proxy further comprises:
   a second proxy, said second proxy capable of communicating with at least said master monitoring agent and said second master monitoring agent.

4. The highly available system of claim 3 wherein, said proxy and said second proxy engage in load balancing activities.

5. The highly available system of claim 4 wherein, said load balancing activities are performed by a source method.

6. The highly available system of claim 1 wherein, said highly available system is horizontally scalable.

7. The highly available system of claim 1 wherein, said master monitoring agent and said second master monitoring agent will authenticate themselves with each instance of a monitoring agent.

8. A load distribution system comprising:
   at least one host with at least one monitoring agent configured to send data;
   a cloud based proxy configured to receive said data, said cloud based proxy comprising:
   an adapter configured to receive said data; and
   a master monitoring agent configured to command said at least one monitoring agent; and
   a proxy, said proxy capable of communicating with at least said master monitoring agent and a second master monitoring agent;
   at least one secondary cloud based proxy capable of communicating with said cloud based proxy, said secondary cloud based proxy comprising:
   a second adapter configured to receive said data;
   said second master monitoring agent configured to command said at least one monitoring agent; and
   a second proxy, said second proxy capable of communicating with at least said master monitoring agent and said second master monitoring agent; and
   a node, wherein said node communicates with at least said cloud based proxy and said secondary cloud based proxy.

9. The load distribution system of claim 8 wherein, said proxy and said second proxy engage in load balancing activities.

10. The load distribution system of claim 9 wherein, said load balancing activities are performed by a source method.

11. The load distribution system of claim 8 wherein, said cloud based proxy further comprises:
   a failover server; and
said at least one secondary cloud based proxy further comprising:
   a second failover server, configured to communicate with said failover server.

12. The load distribution system of claim 11 wherein, said failover server reroutes said data to said second failover server in event of failure of upstream components.

13. The load distribution system of claim 8 wherein, said master monitoring agent and said second master monitoring agent will authenticate themselves with each instance of a monitoring agent.

14. A highly available load distribution system comprising:
   at least one host with at least one monitoring agent configured to send data;
   a cloud based proxy configured to receive said data, said cloud based proxy comprising:
      an adapter configured to receive said data;
      a master monitoring agent configured to command said at least one monitoring agent;
      a proxy, said proxy capable of communicating with at least said master monitoring agent and a second master monitoring agent; and
      a failover server;
   at least one secondary cloud based proxy capable of communicating with said cloud based proxy, said at least one secondary cloud based proxy comprising:
      a second adapter configured to receive said data;
      a second master monitoring agent configured to command said at least one monitoring agent;
      a second proxy, said second proxy capable of communicating with at least said master monitoring agent and said second master monitoring agent; and
      a second failover server, configured to communicate with said failover server; and
   a node, wherein said node communicates with at least said cloud based proxy and said at least one secondary cloud based proxy.

15. The highly available load distribution system of claim 14 wherein, said failover server reroutes said data to said second failover server in event of failure of upstream components.

16. The highly available load distribution system of claim 14 wherein, said proxy and said second proxy engage in load balancing activities.

17. The highly available load distribution system of claim 16 wherein, said load balancing activities are performed by a source method.

18. The highly available load distribution system of claim 14 wherein, said highly available load distribution system is horizontally scalable.

19. The highly available load distribution system of claim 14 wherein, said master monitoring agent and said second master monitoring agent will authenticate themselves with each instance of a monitoring agent.

* * * * *